April 27, 1943.  V. HAIGH  2,317,761

TRANSMISSION

Filed May 31, 1940  2 Sheets-Sheet 1

Inventor:
Vaughn Haigh
By: Edward C. Gritzbaugh
Atty.

April 27, 1943.   V. HAIGH   2,317,761
TRANSMISSION
Filed May 31, 1940   2 Sheets-Sheet 2
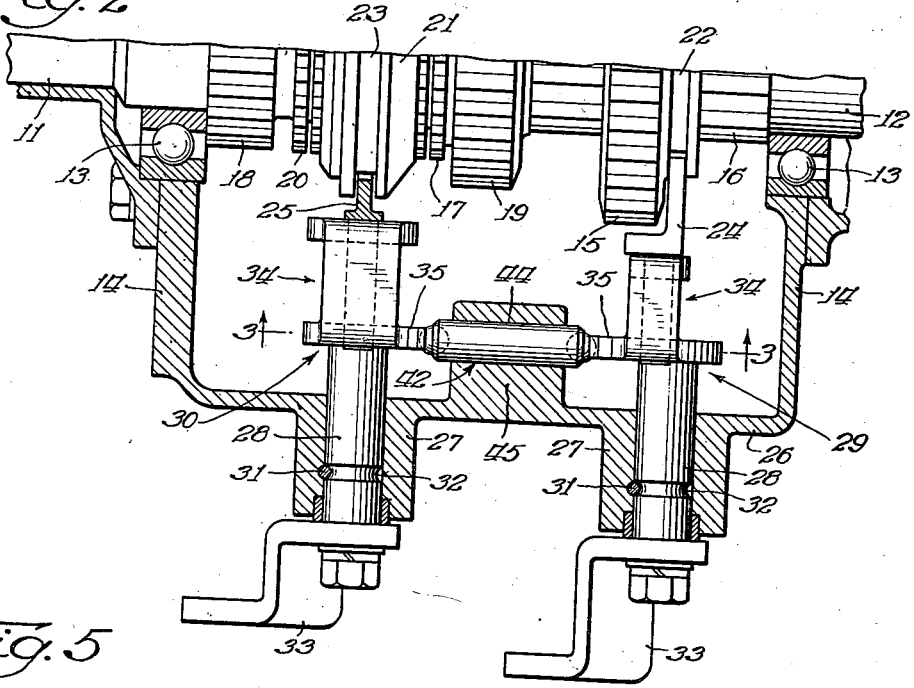
Inventor:
Vaughn Haigh
By: Edward C. Gritzbaugh
Atty Patented Apr. 27, 1943

2,317,761

UNITED STATES PATENT OFFICE 2,317,761

TRANSMISSION

Vaughn Haigh, Muncie, Ind., assignor to Borg-Warner Corporation, Chicago, Ill., a corporation of Illinois Application May 31, 1940, Serial No. 338,176

2 Claims. (Cl. 74—477)

This invention relates to change speed transmissions of the type employed in motor vehicles and deals particularly with mechanism of the type controlled from the steering column for shifting the gears and jaw clutch torque transmitting elements thereof.

A transmission of this type usually incorporates a pair of cranks extending through the side wall of the transmission case, provided at their outer ends with lever arms that are connected to linkage coming from the steering column control mechanism, and, provided inside of the case with crank arms which carry shifting forks for engaging the slidable torque transmitting elements. It is also customary to associate with such crank levers, an interlock device which permits said levers to be shifted only one at a time.

One object of the present invention is to provide a shifting mechanism of the type indicated above, which is of improved and simplified construction and relatively inexpensive to manufacture.

To this end, the invention contemplates, in general, a pair of cranks each having an inner crank arm in the form of a yoke including in one region a sector forming part of the interlock mechanism and in another region a sturdy pivotal support for a shifting fork.

Another object of the invention is to provide an improved interlock device serving the double function of preventing simultaneous shifting of both levers and yieldably holding the levers in their various selective position.

Another object of the invention is to provide a shifting mechanism of the type indicated, wherein each lever has its inner crank arm formed with a sector region comprising two diametrically opposed notched sectors, the adjacent sectors of the two levers coacting with an interlock element and the remote sectors coacting with yieldable positioning poppet devices.

Other objects, the advantages and uses of the invention will become more apparent after reading the following specification and claims, and after consideration of the drawings forming a part of the specification, wherein:

Fig. 2 is a horizontal longitudinal sectional view thereof taken as indicated by the line 2—2 of Fig. 1;

Fig. 5 is a longitudinal view through a portion of the transmission embodying a modified form of the invention.

Figure 1:
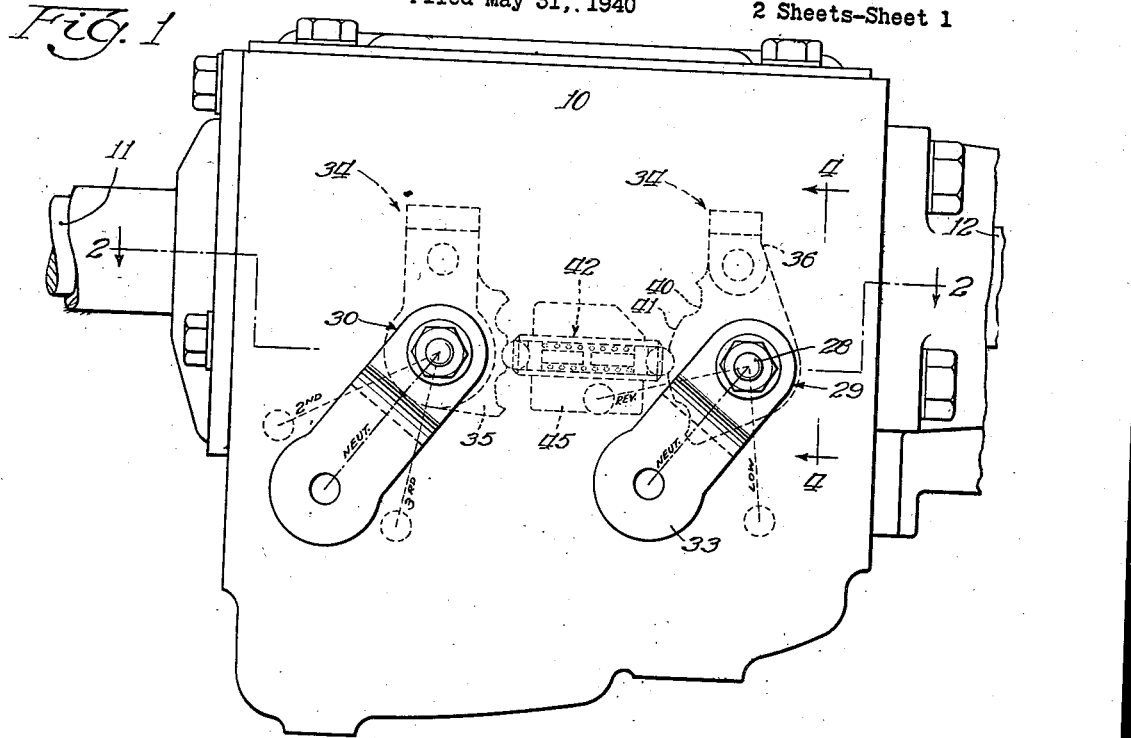
Fig. 1 is a side elevation of a transmission embodying the invention.

As an example of one form in which the invention may be embodied, I have shown in Figs. 1 to 4 inclusive, a motor vehicle transmission including a case 10, a drive shaft 11 and tail shaft 12 journalled in bearings 13 in the end walls 14 of the case 10, a combined low and reverse gear 15 axially slidable upon a splined section 16 of the driven shaft 12, an intermediate clutch element 17 rotatable on the driven shaft 12 and driven at a reduced ratio from the driving shaft 11 through reduction gearing including the gears 18 and 19 attached to the shaft 11 and clutch element 17 respectively, a direct drive clutch element 20 on the drive shaft 11, and a shiftable positive jaw clutch sleeve 21 adapted to transfer the drive from the second speed clutch element 17 or the direct drive clutch element 20 to the driven shaft 12 to which the sleeve 21 is drivingly connected.

The gear 15 and clutch sleeve 21 are provided respectively with annular channels 22 and 23 in which are engaged the shifting forks 24 and 25.

In the side wall 26 of the transmission case is a pair of bearing bosses 27 in which are journalled the shaft portions 28 of the shifting cranks 29 and 30 respectively. The shafts 28 are positioned against endwise movement by keys 31 mounted in the bosses 27 and engaged in annular grooves 32 in the respective shafts.

To the outer ends of the shafts 28 are secured operating levers 33 which are connected, by linkage (not shown) to the steering post control mechanism.

To the inner ends of the shafts 28 are secured crank arms 34 to which the forks 24 and 25 are pivoted. The crank arms 34 (Fig. 3) are heavy sheet metal stampings, each comprising a sector portion 35 into which the reduced end 28a of a respective shaft 28 is riveted as indicated in Fig. 4, and a yoke portion 36 the respective sides of which are provided with openings 37 in which the shaft 38 of the corresponding fork 24 or 25 is journalled. A sleeve 39, secured at its ends, as by welding, to the respective sides of the yoke, forms a strut for stiffening the yoke.

Each sector 35 is formed with notches 40 respectively separated by high regions 41 of the sector peripheries. In the form of the invention shown in Fig. 3, the notches 40 are located in the adjacent peripheral regions of the sector, and cooperate with a combined interlock and yieldable positioning poppet device 42. The interlock device 42 comprises a tube 43 slidably mounted in a bore 44 in a boss 45 formed on the side wall 26 of the transmission case. Within the sleeve in the end regions thereof are a pair of balls 47. The balls 47 are engageable in the notches 40 and are yieldingly urged outwardly by means of a coil spring 48. Engaged between the ends of the coil spring 48 and the balls 47 are the heads 49 of a pair of abutment elements having stems 50 extending toward each other within the spring 48.

The stems 50 are of such length as to permit one of the balls 47 to ride upon a high region 41 of its coacting sector so as to permit the corresponding crank to be oscillated for shifting one of the torque transmitting elements. When engaged in a central notch 40, a ball 47 will hold the corresponding crank in a neutral position. When engaged in either of the side notches 40, the ball 47 will yieldingly hold the crank in a position to establish a drive through the transmission.

When one of the cranks is being shifted, the corresponding ball 47 will be moved inwardly as the high region 41 of the sector rides against it, and the stems 50 of the abutment elements are of such length that they will then engage so as to form, together with the balls 47, an unyieldable column between two sectors with the opposite ball 47 bottomed in one of its coacting notches 40 so as to prevent shifting of the other crank. Thus it is impossible to simultaneously shift both cranks.

Figure 3:
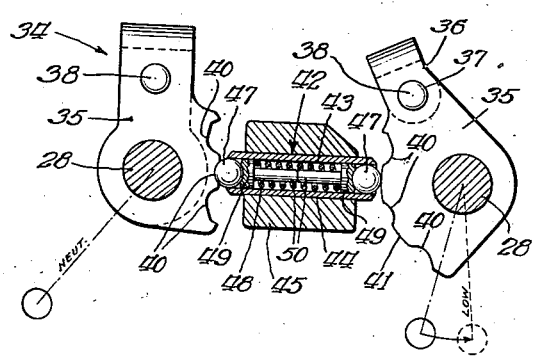
Fig. 3 is a detail vertical sectional view of the interlock mechanism taken as indicated by the line 3—3 of Fig. 2.
Figure 4:
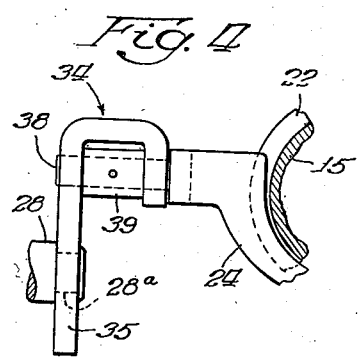
Fig. 4 is a detail transverse vertical sectional view of one of the crank levers and associated parts taken as indicated by the line 4—4 of Fig. 1.

The invention contemplates the employment of a conventional type of control mechanism of such character that when the shifting of a given crank has progressed to the point indicated in Fig. 3, it will be impossible for the shifting lever to engage the linkage leading to the other crank without first coming back to a neutral position.

In the form of the invention shown in Fig. 5, the sector regions 35a of the cranks 34a are each provided with two sectors 35b and 35c respectively. The sectors 35b each have a single notch 40b cooperating with a rigid interlock element 42b slidably mounted in a bore 44b of a boss 45b corresponding to the boss 45 of Fig. 2. The element 42b cooperates with the sectors 35b solely to prevent simultaneous shifting of both cranks. The sectors 35c have notches 40c cooperating with yieldable poppet devices 42c for yieldably holding the cranks in their various selected positions. Each poppet device 42c may comprise a hollow nipple 51 slidably mounted in a bore 52 of a boss 53 formed in an end wall 14 of the case, and urged toward operative position by a spring 54 confined between the closed end 55 of the nipple 51 and a plug 56 threaded into the bore 52. The closed end 55 may be semi-spherical for engagement with the notches 40c.

The cranks 34a are formed with yokes 36a which, in this form of the invention are illustrated as having the side arms both extending to and mounted on the shafts 28.

While I have described my invention in connection with one specific embodiment thereof, it is to be understood that this is by way of illustration and not by way of limitation and the scope of the invention is defined solely by the appended claims which should be construed as broadly as the prior art will permit.

I claim:

1. In a transmission having a case and a plurality of torque transmitting members to be shifted, a pair of cranks for effecting the shift of said members, each of said cranks including a shaft journaled in said case and a unitary stamped sheet metal crank arm of generally U-shape including a pair of side arms and a connecting web, said side arms being mounted on said shaft at their ends opposite said web portion, a shift fork for each crank, comprising a shaft portion extending between and journaled in said side arms adjacent said web and a fork portion cooperating with a member to be shifted, one side arm of each crank arm being formed with a sector portion, said sector portions having notches in their adjacent peripheral regions and other notches in their remote peripheral regions, an interlock element mounted for sliding movement on a fixed axis which lies in the plane of the sectors and intersects the sector axes, the ends of said interlock element being adapted to engage in the adjacent peripheral notches and to permit movement of only one of the cranks at a time, yieldable poppet devices engageable in the remote peripheral notches, and adapted to yieldably position the cranks in their several selective positions.

2. In a transmission having a plurality of torque transmitting members to be shifted and a pair of cranks for effecting the shift of said members, a sector forming part of each crank, said sectors having notches in their adjacent peripheral regions and other notches in their remote peripheral regions, an interlock element mounted for sliding movement on a fixed axis which lies in the plane of the sectors and intersects the sector axes, the ends of said interlock element being adapted to engage in the adjacent pripheral notches and to permit movement of only one of the cranks at a time, yieldable poppet devices engageable in the remote peripheral notches, and adapted to yieldably position the cranks in their several selective positions.

VAUGHN HAIGH.